(12) United States Patent
Siira

(10) Patent No.: US 6,353,601 B1
(45) Date of Patent: *Mar. 5, 2002

(54) METHOD FOR SELECTING A SIGNAL, AND A CELLULAR RADIO SYSTEM

(75) Inventor: Mikko Siira, Oulu (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/812,329

(22) Filed: Mar. 5, 1997

(51) Int. Cl.[7] ................................................ H04Q 7/20
(52) U.S. Cl. .................... 370/331; 455/437; 455/440; 455/456; 455/562
(58) Field of Search ................... 455/436, 437, 455/438, 440, 444, 561, 562, 439, 441, 443, 524–525; 370/331, 328

(56) References Cited

U.S. PATENT DOCUMENTS 5,548,583 A * 8/1996 Bustamante ................. 370/335
5,812,947 A * 9/1998 Dent ........................... 455/427
5,893,033 A * 4/1999 Keskitalo et al. ........... 455/437

FOREIGN PATENT DOCUMENTS

| EP | 0 753 978 | 6/1996 |
| GB | 2 281 008 A | 2/1995 |
| WO | WO 93/12590 | 6/1993 |
| WO | WO 96/38015 | 5/1995 |
| WO | WO 96/37976 | 11/1996 |
| WO | WO 97/46034 | 12/1997 |

OTHER PUBLICATIONS

PCT International Search Report, completed Jul. 23, 1998 (previously submitted).

* cited by examiner

Primary Examiner—Ajit Patel
(74) Attorney, Agent, or Firm—Pillsbury Winthrop LLP

(57) ABSTRACT

The invention relates to a method for setting up a connection and to a cellular radio system used during a hand-off. The cellular radio system comprises subscriber terminals and base stations that communicate with the subscriber terminals and that form antenna beams that are oriented towards the subscriber terminal in order to set up an optimum connection to the subscriber terminal. The cellular radio system comprises calculation means for calculating the location of the subscriber terminal in the cellular radio system on the basis of the established connection, the base stations that set up the connection to the subscriber terminal orienting their antenna beams rapidly towards the subscriber terminal on the basis of the aforementioned location data.

17 Claims, 2 Drawing Sheets

METHOD FOR SELECTING A SIGNAL, AND A CELLULAR RADIO SYSTEM

FIELD OF THE INVENTION

The invention relates generally to telecommunication systems. More precisely, the invention relates to a digital cellular radio system utilizing a soft hand-off, particularly to a system implemented with the SDMA method.

BACKGROUND OF THE INVENTION

A typical cellular radio system comprises a fixed base station network, and a subscriber terminal communicates with one or more base stations of the network. A base station forwards the communication that arrives from a subscriber terminal. While moving or remaining stationary, subscriber terminals may transmit messages via the base stations both to each other and to subscriber terminals of other telephone systems. The transmission of messages is possible when the subscriber terminals are located in the coverage area of the base station network. In order for a subscriber terminal to be able to use the services provided by the cellular radio system, it should maintain a connection to at least one base station under all circumstances. When a subscriber terminal does not use the services provided by the base station network, it does not need a connection to the base station network but it listens to the base stations in an idle mode. When the subscriber terminal moves in the base station network from the coverage area of one base station to the coverage area of another base station, this creates a need to change the channel or the base station.

When a subscriber terminal moves from one cell to another in a cellular radio system, the system performs a hand-off, which is either a hard hand-off in a simple case or a more flexible soft hand-off. In a typical cellular radio system, a subscriber terminal communicates with only one base station at a time, even though especially for example in a CDMA (Code Division Multiple Access) system the subscriber terminal may also communicate simultaneously with several base stations. In a prior art soft hand-off, the connection to the base station network is maintained despite the hand-off. In such a hand-off, the base station is usually changed. The prior art also comprises a softer hand-off where the base station is not changed, but the sector of the base station used is changed. A soft and a softer hand-off are called make-before-break-type hand-offs, which means that a new connection is set up for the subscriber terminal before the connection to the previous base station is terminated. The frequency band used is not changed in either hand-off.

Another method is a SDMA (Space Division Multiple Access) method wherein the users are distinguished from one another on the basis of their location. This takes place in such a manner that at the base station the antenna beams are oriented to the desired directions on the basis of the location of the mobile stations. This requires the use of adaptive antenna arrays, i.e. phased antennas, and processing of the received signal by means of which the mobile stations are tracked.

The use of SDMA in connection with CDMA provides several advantages compared to the prior methods, such as sectorization. If the beams of the sectors are narrowed in sectorization in order to increase the spectral efficiency, the number of the hand-offs to be carried out from one sector to another also increases. This in turn increases too much the calculation capacity required in the base station controller, for example.

Prior hand-off methods have drawbacks, however. All the base stations participating in the hand-off do not transmit a signal to the subscriber unit rapidly enough. The aforementioned problems also occur in the reception of signals transmitted by the subscriber terminal. Problems occur, for example, since the transceiver antennas of the base stations cannot be oriented sufficiently rapidly to the optimum direction, whereupon the direction of the transmission beam of the antenna is not optimum. For example, if the base station does not transmit a signal to the optimum direction, the subscriber terminal does not necessarily receive all the signals that have been transmitted. There have been efforts to eliminate the problems resulting from the orientation of the transmission beams by increasing the transmit power. However, increasing the transmit power has raised the level of interference in the network.

CHARACTERISTICS OF THE INVENTION

The purpose of the present invention is to realize a method that is used in a cellular radio system which is implemented with the SDMA technique and wherein a base station antenna is oriented rapidly to the optimum direction.

This is achieved with a method according to the invention for setting up a connection, used in a cellular radio system comprising subscriber terminals and base stations that form antenna beams which are oriented towards a subscriber terminal in order to set up an optimum connection, in which method the location of the subscriber terminal in the cellular radio system is calculated, and wherein the base station orients its antenna beam towards the subscriber terminal on the basis of the subscriber terminal location data.

The invention also relates to a method for setting up a connection, used during a hand-off in a cellular radio system comprising at least one subscriber terminal and base stations that form antenna beams which are oriented towards the subscriber terminal in order to set up an optimum connection, in which method the location of the subscriber terminal is calculated on the basis of the connection to the base station, and wherein the antenna beam of the base station that sets up the connection to the subscriber terminal is oriented towards the subscriber terminal by utilizing the location data calculated above.

The invention further relates to a cellular radio system used during a hand-off, the cellular radio system comprising subscriber terminals and base stations that communicate with the subscriber terminals and that form antenna beams that are oriented towards a subscriber terminal in order to set up an optimum connection with the subscriber terminal, the cellular radio system comprising calculation means for calculating the location of the subscriber terminal in the cellular radio system on the basis of the established connection, the base stations that set up the connection to the subscriber terminal orienting their antenna beams towards the subscriber terminal on the basis of the aforementioned location data.

The arrangement according to the invention provides several advantages. The arrangement according to the invention can be used both in the downlink and the uplink direction during a hard and a soft hand-off. The arrangement enables the orientation of the base station antenna rapidly towards the subscriber terminal when the base station is transmitting a signal. The rapid orientation of the antenna enables fast connection set-up during a hand-off. The arrangement also enables a higher network capacity. The antenna is also oriented rapidly towards the subscriber terminal when the base station receives a signal from the subscriber terminal. In the cellular radio system according to the invention, it is possible to use a longer distance between the base station and the subscriber terminal compared to the prior art, since the present arrangement enables a lower interference level. The base station orients its antenna towards the subscriber terminal on the basis of subscriber terminal location data calculated in advance. The arrangement can be used for example in TDMA and CDMA cellular radio systems implemented with the SDMA method.

DESCRIPTION OF THE DRAWINGS

In the following, the invention will be described in greater detail with reference to the examples according to the accompanying drawings, in which.

DESCRIPTION OF THE PREFERRED EMBODIMENTS

Figure 1:
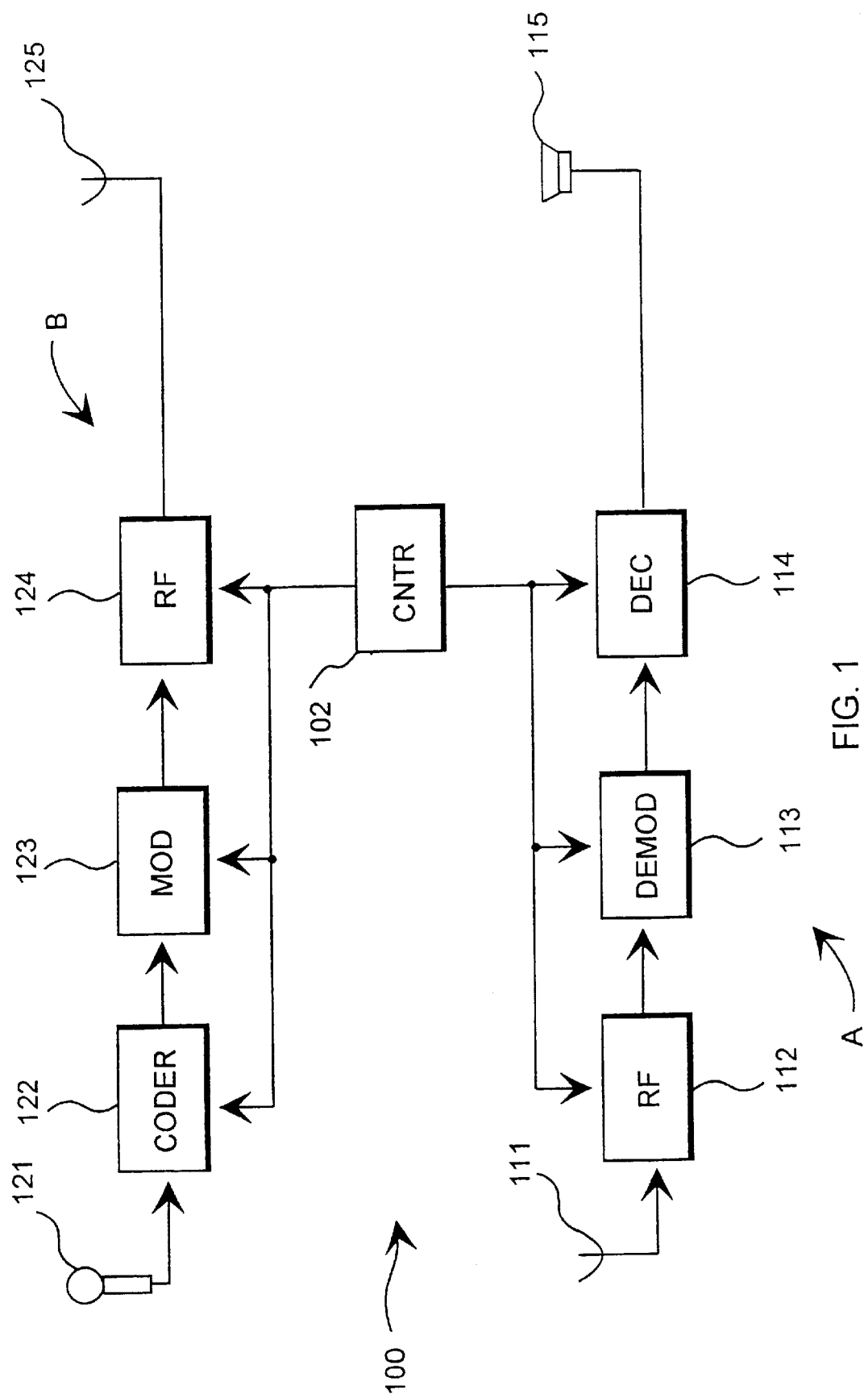
FIG. 1 is a general block diagram illustrating a prior art transceiver.

FIG. 1 shows the essential parts of a transceiver 100 used in the arrangement according to the invention. In the example, the transceiver 100 is a subscriber terminal, for example a mobile phone. The subscriber terminal 100 comprises a receiving end A and a transmitting end B. The receiving end A comprises an antenna 111, radio-frequency parts 112, a demodulator 113, a decoder 114 and a headphone 115. The transmitting end B comprises a microphone 121, an encoder 122, a modulator 123, radio-frequency parts 124 and an antenna 125. The subscriber terminal 100 also comprises control means 102 that are shared by the receiving end A and the transmitting end B.

The receiving end A of the subscriber terminal 100 shown in FIG. 1 operates in the following manner. The radio-frequency parts 112 of the subscriber terminal 100 transfer a radio-frequency analog signal from the antenna 111 to an intermediate frequency and they filter the signal. The radio-frequency parts 112 also detect the intermediate-frequency signal. The demodulator 113 restores the broadband signal into a narrow-band data signal. The data signal is decoded in a suitable manner by the decoder 114. The decoder 114 decodes a signal which has typically been convolutional-coded, and the operation of the decoder 114 is based on the Viterbi algorithm, for example. Usually, the decoder 114 also performs the decryption and deinterleaving of the pretreated signal. From the decoder 114 the signal is forwarded to the headphone 115.

The transmitting end B of the subscriber terminal 100 operates in the following manner. The microphone 121 receives an audio signal and transmits the electric counterpart of the signal to the encoder 122. The encoder 122 convolutional-codes and typically encrypts the signal. The encoder 122 also interleaves the signal bits or bit groups. The convolutional-coded narrow-band signal is subjected to pseudonoise coding and converted into a broadband spread-spectrum signal in the modulator 123. The spread-spectrum signal is thereafter converted into a radio-frequency form according to known technology in the radio-frequency parts 124 and transmitted via the antenna 125 to the radio path.

The control means 102 control the operation of both the receiving end A and the transmitting end B of the subscriber terminal 100. The antennas 111 and 125 are transmitting and receiving antennas of a prior art subscriber terminal 100. The functions of the transmitting and the receiving antenna 111 and 125 are combined in practice into the same antenna. The microphone 121, the headphone 115 and the radio-frequency parts 112 and 124 are also prior art components used in known radio systems. In practice, the subscriber terminal 100 also comprises other components, such as different encoding and converter elements. If the transceiver shown in the figure operated as a base station, the transceiver would not comprise for example a microphone 121 and a headphone 115.

Figure 2:
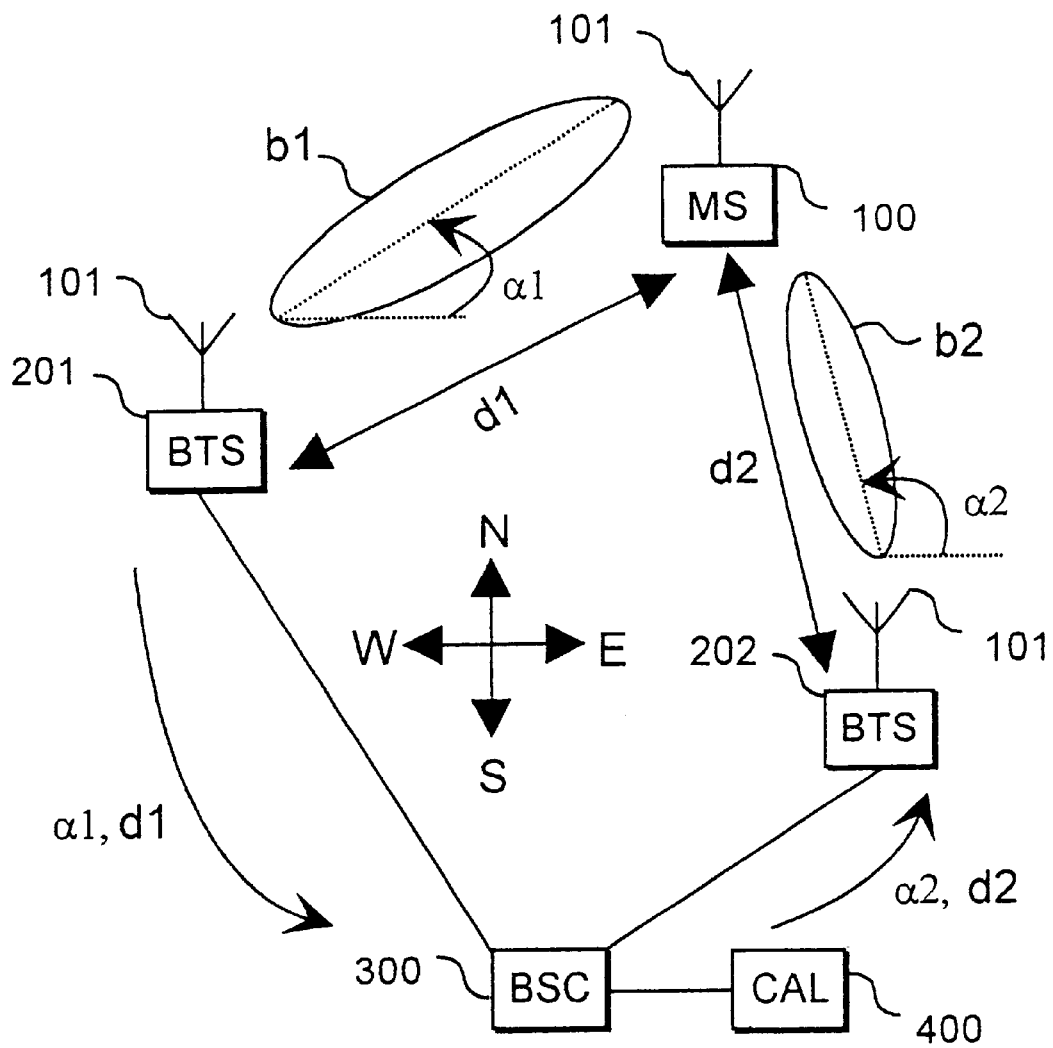
FIG. 2 shows a cellular radio system according to the invention.

FIG. 2 shows a cellular radio system comprising a subscriber terminal 100 that is in practice for example a mobile phone. The cellular radio system also comprises a first base station 201, a second base station 202 and a base station controller 300. The cellular radio system further comprises means 300 communicating with the base stations 201, 202. The operation of the cellular radio system may be based on the TDMA or the CDMA method, for example. The base stations 201, 202 and the subscriber terminal comprise an antenna 101. The antenna 101 operates as a transceiver antenna. The antennas 101 of the base stations 201, 202 form beams via which a connection is set up for example to the subscriber terminal 100. The beams are denoted in the figure with b1, b2. The cellular radio system shown in the figure is implemented with the SDMA method. In the SDMA method, the beams of the base station antennas are oriented to the desired directions on the basis of the location of the mobile stations, i.e. subscriber terminals.

An antenna may form several beams at least one of which is the main beam. The radiation of the main beam is the strongest compared to the other beams. Generally, a connection with the best quality is set up for example when the axis of the main beam is oriented towards the receiver. In the arrangement shown in the figure, the base station 201 communicates with the subscriber terminal 100. The subscriber terminal 100 and the base station 201 are situated at a certain interval from one another. The aforementioned distance is denoted by d1. The base station 201 transmits a beam b1 to a predetermined direction. In the arrangement shown in the figure, the beam of the base station 201 forms an angle α1 with the assumed geographical east-west direction.

The cellular radio system comprises calculation means 400 that are adapted to calculate the distance d1 between the base station 201 and the subscriber terminal 100. The calculation means 400 communicate with the base stations 201, 202 and the base station controller 300. In practice, the calculation means 400 are situated for example in the base station controller. Further, the calculation means 400 calculate the transmission direction of the radiation pattern of the base station 201. The transmission direction refers in this case to the angle α1 of the beam. When the aforementioned values d1 and α1 have been calculated, the location of the subscriber terminal 100 in the cellular radio system can be determined.

In the cellular radio system, the geographical locations of the base stations 201, 202 with respect to each other are previously known. The location data may be stored for example in a database situated in the base station or the base station controller 300, for instance. During a hand-off, the subscriber terminal 100 communicates simultaneously with the base stations 201, 202. In such a situation, the calculation means 400 calculate the location of the subscriber terminal 100 in the cellular radio system by utilizing the values d1 and α1 calculated above. The calculation means 400 thereafter calculate values d2, α2 for the base station 202 by utilizing the values d1 and α1.

The calculation means 400 are adapted to transmit the values d2, α2 to the base station 202, which receives the transmitted data and simultaneously orients its antenna 101 towards the subscriber terminal 100. The method according to the invention enables the rapid transmission of the signal from the base station 202 to the subscriber terminal 100 over an optimum connection. Similarly, the base station 202 may receive the signal transmitted by the subscriber terminal 100 from the correct direction by orienting the axis of its beam b2 towards the subscriber terminal 100. The base station 202 may orient its antenna beam towards the subscriber terminal 100 already in advance before the connection is set up.

The method according to the invention can be used both in the downlink and the uplink direction during a hard and a soft hand-off. The method enables the orientation of the antenna beam of the base station 201, 202 when the base station transmits a signal towards the subscriber terminal 100. When the subscriber terminal 100 transmits a signal, the base station is able to orient the antenna towards the subscriber terminal 100 on the basis of the subscriber terminal location data calculated in advance. The method can also be used in for example TDMA and CDMA cellular radio systems that are implemented with the SDMA method.

The rapid orientation of the antenna beam towards the subscriber terminal 100 enables a faster hand-off. The orientation of the antenna beam towards the subscriber terminal enables a better range for the signal, so that the distance between the subscriber terminal and the base station can be increased. Due to a faster hand-off, the level of interference in the cellular radio network remains low. The low level of interference enables the use of a higher capacity in the cellular radio network. Due to the low interference level, the quality of the signal constituting the connection can be maintained at a high level.

Even though the invention is described above with reference to the example according to the accompanying drawings, it is clear that the invention is not restricted thereto, but it can be modified in several ways within the scope of the inventive idea disclosed in the appended claims.

What is claimed is:

1. A method for setting up a connection, used during a hand-off in a cellular radio system including subscriber terminals and a plurality of base stations including a first base station that form antenna beams which are steered towards a subscriber terminal in order to set up an optimum connection, the method comprising:

calculating a location of the subscriber terminal in the cellular radio system in relation to one of the base stations, wherein the calculating includes calculating a transmission direction angle of a radiation pattern of the first base station; and at least one other base station steering its antenna beam towards the subscriber terminal on the basis of the calculated subscriber terminal location when the location is calculated.

2. A method for setting up a connection, used during a hand-off in a cellular radio system including at least one subscriber terminal and a plurality of base stations including a first base station that form antenna beams which are steered towards the subscriber terminal in order to set up an optimum connection, the method comprising:

calculating a location of the subscriber terminal in the cellular radio system on the basis of the connection to the first base station, wherein the calculating includes calculating a transmission direction angle of a radiation pattern of the first base station; and the antenna beam of at least one other base station being steered towards the subscriber terminal by utilizing the calculated location when the location is calculated.

3. A method according to claim 1 or 2, wherein the subscriber terminal location data consists of the direction and distance of the subscriber terminal with respect to the base station.

4. A method according to claim 3, wherein the data concerning the direction and distance of the subscriber terminal is used for determining the location of the subscriber terminal with respect to another base station.

5. A method according to claim 1 or 2, which method is used during a hand-off and wherein the subscriber terminal location data is transmitted to the base station in advance.

6. A method according to claim 1 or 2, wherein the locations of the base stations in the cellular radio system with respect to each other are previously known.

7. A method according to claim 1 or 2, the method comprising calculating, on the basis of the established connection, the angles of transmission and reception of the base station antenna beams and the distance of the subscriber terminal from the base station, the aforementioned data being used to calculate the angles of transmission and reception of the antenna beam used in some other base station, and the length of the delay over the connection between the aforementioned base station and subscriber terminal.

8. A method according to claim 1 or 2, used in a cellular radio system that is realized with the SDMA method.

9. A cellular radio system used during a hand-off, the cellular radio system including subscriber terminals and a plurality of base stations including a first base station that communicate with the subscriber terminals and that form antenna beams that are steered towards a subscriber terminal in order to set up an optimum connection with the subscriber terminal, the cellular radio system comprising:

calculation means for calculating a location of the connected subscriber terminal, the calculating means including means for calculating a transmission direction angle of a radiation pattern of the first base station;

wherein at least one of the base stations steers its antenna beam towards the subscriber terminal on the basis of the calculated location when the location is calculated.

10. A cellular radio system according to claim 9, wherein the subscriber terminal location data consists of the direction and distance of the subscriber terminal with respect to the base station.

11. A cellular radio system according to claim 10, wherein the direction of the subscriber terminal is calculated from the angles of transmission and reception of the antenna beam.

12. A cellular radio system according to claim 9, wherein the calculation means calculate the angles of transmission and reception of the antenna beam of some other base station and the signal delay between the subscriber terminal and the base station on the basis of the connection set up previously.

13. A cellular radio system according to claim 9, wherein the location data is utilized for determining the location of the subscriber terminal with respect to some other base station.

14. A cellular radio system according to claim 9, wherein the calculation means are adapted to transmit the location data to the base station in advance.

15. A cellular radio system according to claim 9, wherein the locations of the base stations in the cellular radio system with respect to each other are previously known.

16. A cellular radio system according to claim 9, used in a cellular radio system realized with the SDMA method.

17. A method for setting up a connection used during a handoff in a cellular radio system, the method comprising:
   (a) defining a distance in accordance with a position of at least one subscriber terminal and a position of a first of a plurality of base stations;
   (b) the first base station transmitting a main antenna beam towards the at least one subscriber terminal;
   (c) calculating a location of the at least one subscriber terminal based upon the distance and a transmission direction angle of the main beam;
   (d) communicating the location of the at least one subscriber terminal to the least one other of the plurality of base stations; and
   (e) simultaneously steering an antenna beam of the at least one other base station towards the at least one subscriber terminal based upon the location, simultaneously steering the antenna beam in order to set up an optimum connection when the location is calculated.

* * * * *